C. A. Watkins' Needle for Weaving Splint Chair Seats.

№ 3712

Reissued

Nov 2 1869

Witnesses:
M. Comuly
A. Keller

C. A. Watkins

United States Patent Office.

G. A. WATKINS, OF PROCTORSVILLE, VERMONT.

*Letters Patent No.* 75,500, *dated March* 10, 1868; *reissue No.* 3,712, *dated November* 2, 1869.

IMPROVEMENT IN DEVICE FOR WEAVING CHAIR-SEATS.

The Schedule referred to in these Letters Patent and making part of the same.

*To all whom it may concern:*

Be it known that I, G. A. WATKINS, of Cavendish, Proctorsville Post Office, in the county of Windsor, and State of Vermont, have invented a new and useful Needle or Device for Weaving Splint Chair and other Seats or Bottoms, of which the following is a full, clear, and exact description, reference being had to the accompanying drawing, forming part of this specification, and in which—

Figure 1:
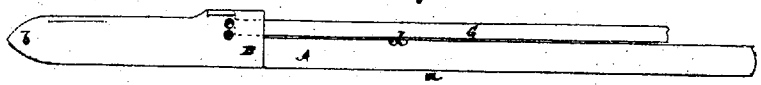
Figure 2:
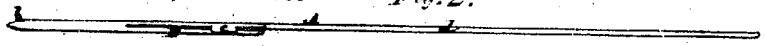
Figure 3:
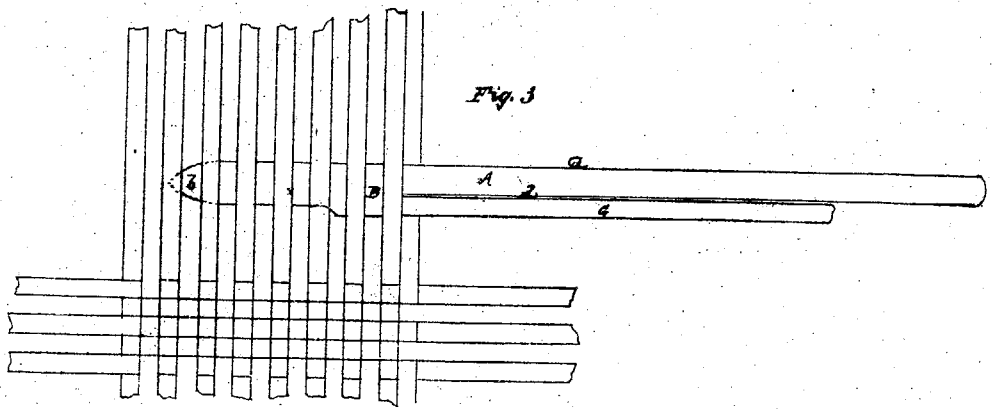

Figure 1 represents a side view of my invention in one of its forms, with splint attached;

Figure 2, an edge view of the same;

Figure 3, a diagram illustrating how the same is or may be applied; and

Figure 4:
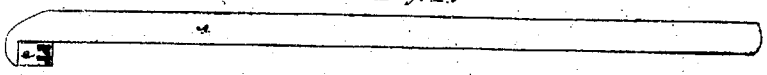

Figure 4, a side view of a modification of the device.

My improvement has for its object facilitating or expediting the interlacing or weaving of splints, of single lengths, in the formation of splint chair or other seats or bottoms. This is usually done by first arranging a series of splints to compose the warp, and afterward interlacing, by hand direct, the weft-splints or filling, threading them in succession, or at suitable distances, alternately above and below the warp-splints, and afterward beating up the filling by a file or any other suitable and convenient tool or stick. Such is comparatively a slow process; and My invention consists in a device for the purpose of weaving the splints, so constructed that it will answer as a needle or shuttle to carry the filling-splint through the warp, and also serve as a stick or batten, for beating up the previous filling.

Referring to the accompanying drawing, or more especially figs. 1, 2, and 3, thereof—

A represents a flat or other suitably-shaped bar, made of suitable material, the back edge *a* of which may be straight, and its one end *b* rounded or pointed, at or near which end it is constructed to form a spring-jaw, B, having a shoulder or projection, *c*, against which, on opening the jaw that serves to hold the splint G, the one end of the latter is made to but, to adjust the filling-splint to its place along the edge *d* of the bar; or, instead of a spring-jaw, B, the bar, at its forward end, may, as represented in fig. 4, be formed with a recess, *e*, and spurs, *s*, to hold the splint at its end, or be otherwise suitably constructed to hold the splint in a secure but detachable manner.

In case of the spring-jaw B, spurs may also be employed, but will not be found generally requisite.

To use the needle or shuttle, and beating-up stick or batten, which is or may be of greater length than the width of the web, it is advisable, where working with the hand, to use two of such implements, alternately or in succession, by, after properly arranging the warp-splints, first attaching the one end of a filling-splint to the jaw or holding-portion of the one bar, and so that it lies against the one edge *d* thereof, and then, with such needle and its splint, interlacing or threading the warp, after which the jaw may be sprung open to detach the bar, needle, or shuttle from the splint, (or the detachment be otherwise effected,) and said needle withdrawn from the web, then throwing through the shed, after it has been changed, the second needle, with its filling-splint; and so on, alternately or in succession, till the seat is woven, each needle in turn answering, after it has threaded its splint, and previously to withdrawing it, to beat up, as a batten, the preceding filling, by, where the process is a hand one, a loom-action being substituted, if desired, clutching both ends of said needle with the hands, and drawing it sharply toward the web or woven portion of the seat.

In this way may chair and other seats or bottoms formed of splints, in single lengths, be woven much more expeditiously and easily than by the ordinary or previous hand-process of making them.

Having thus described my invention,

What I claim as new, and desire to secure by Letters Patent, is—

1. A hand-needle or shuttle, for weaving splint chair-seats, provided with devices, herein shown and described, to hold the splints at their one end in such a manner that the splint may be readily detached therefrom, after it has been passed through the warp, substantially as specified.

2. A needle or shuttle, constructed as described, to hold the splints at their one end in such a manner that the splint may be readily detached therefrom after it has been passed through the warp, and shaped to form a batten, for beating up the filling, substantially as specified.

G. A. WATKINS.

Witnesses:
H. L. WATTENBERG,
A. R. HAIGHT.